Figure 1:
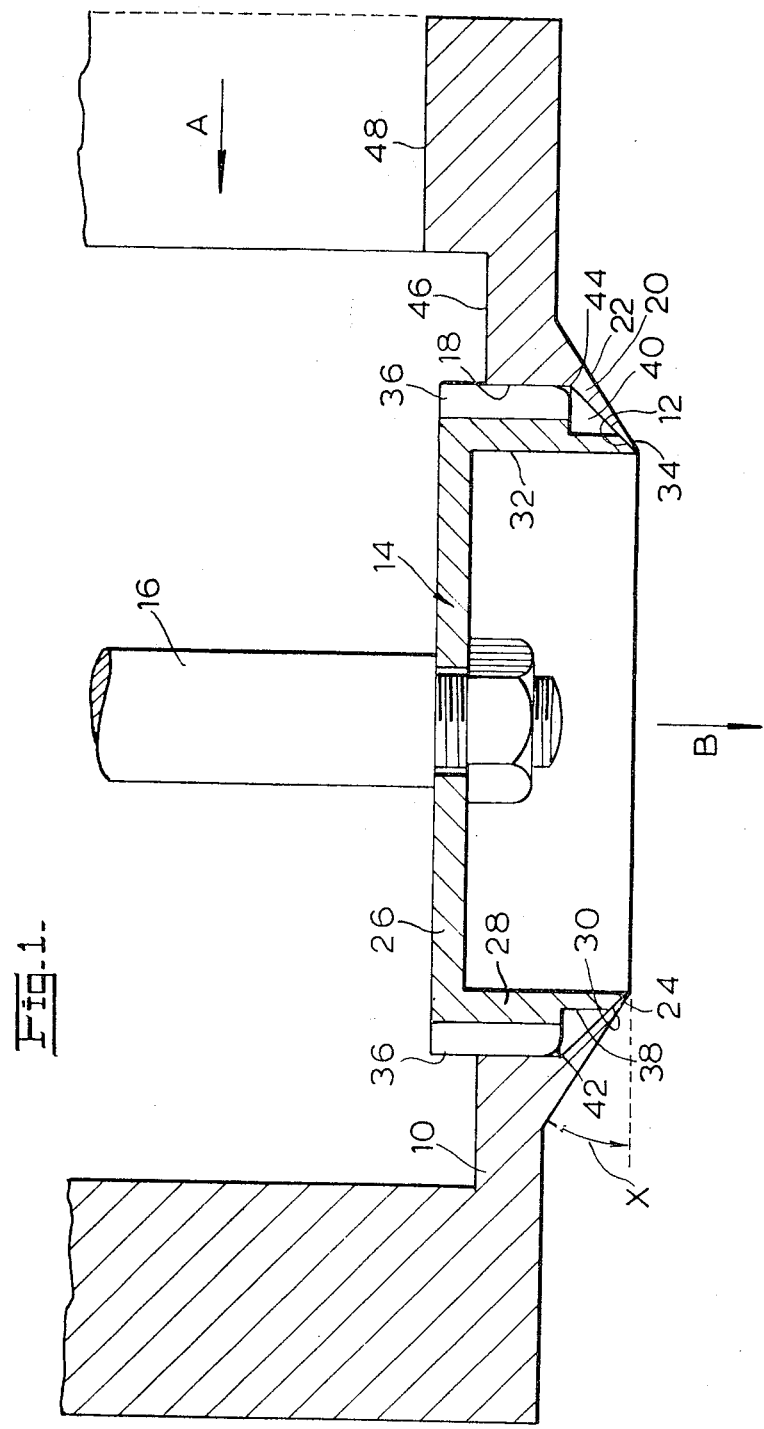

United States Patent [19]
Topham

[11] 3,753,547

[45] Aug. 21, 1973

[54] LIQUID VALVES

[75] Inventor: Michael Johnston Topham, Sale, England

[73] Assignee: English Calico Limited, Manchester, England

[22] Filed: Mar. 22, 1972

[21] Appl. No.: 236,951

[30] Foreign Application Priority Data
Mar. 27, 1971 Great Britain.............. 8,192/71

[52] U.S. Cl. ............................................. 251/120
[51] Int. Cl. .......................................... F16k 47/00
[58] Field of Search................. 251/120, 121, 122, 251/125, 205, 210

[56] References Cited
UNITED STATES PATENTS
779,336    1/1905    Wilkinson ................. 251/125 X
2,006,688  7/1935    Schmiedeknecht .......... 251/120 X
3,700,005  10/1972   Wellman ....................... 251/122

Primary Examiner—Henry T. Klinksiek
Attorney—John W. Malley et al.

[57] ABSTRACT

The invention concerns valves of the type for downwardly delivering liquid from a liquid store and which comprise a valve body bearing an annular valve seat and a circular closure member, the closure member and the valve body being relatively displaceable for opening and closing of the valve. In order for the valve operation to be substantially drip-free, the lowermost rim of the valve body and the lowermost rim of the closure member each comprise a respective knife edge which, when the valve seat and closure member are in their closed position, mate together to define a composite, depending knife edge.

11 Claims, 2 Drawing Figures

LIQUID VALVES

The present invention relates to valves and particularly to valves for delivering quantities of liquid from a storage vessel.

It is desirable that such a valve should provide a smooth and rapid flow when fully open, a restricted flow as a target quantity of liquid for delivery is approached, and a sharp cut-off of the flow when the target is reached. It is also desirable that such valves should operate satisfactorily with thick, viscous liquids as well as non-viscous ones.

Presently available valves do not, however, fully possess these desirable properties, especially with regard to the problem of providing a sharp cut-off of the liquid flow. It is characteristic of the known valves that, even when the valve has been closed, some liquid remains on the lower surfaces of the valve which can subsequently drip therefrom. This is a very undesirable characteristic.

It is a principal object of the present invention to provide a valve which is substantially drip-free.

The present invention provides a valve for downwardly delivering liquid from a liquid store, comprising a valve body bearing an annular valve seat, and a circular closure member, the closure member and the valve body being relatively displaceable for opening and closing of the valve, the lowermost rim of the valve body and the lowermost rim of the closure member each comprising a respective knife edge which, when the valve seat and closure member are in their closed position, mate together to define a composite, depending knife edge.

Preferably, the valve seat is formed adjacent the knife edge defined on the valve body.

In order to enable a restricted flow to be obtained as a target quantity of liquid for delivery is approached, the closure member comprises a cylindrical body, which is closed at its upper end and which is adapted to be slidably received in a cylindrical bore in the valve body in an intermediate and closed position of the valve, the body of the closure member having one or more vertically extending slots in its peripheral surface for the restricted passage of liquid in the intermediate position of the valve when said closure member body is partially inserted into said bore.

In a preferred embodiment of the invention, the lowermost rim of the valve body bears the valve seat on its inner face, and the lowermost rim of said cylindrical body of the closure member, engages the valve seat in the closed position of the valve to shut off the flow of liquid through said slots, both said rims being of acute angled section, and the mating surfaces on the valve body and closure member both being of inverted, frusto-conical configuration.

Figure 2:
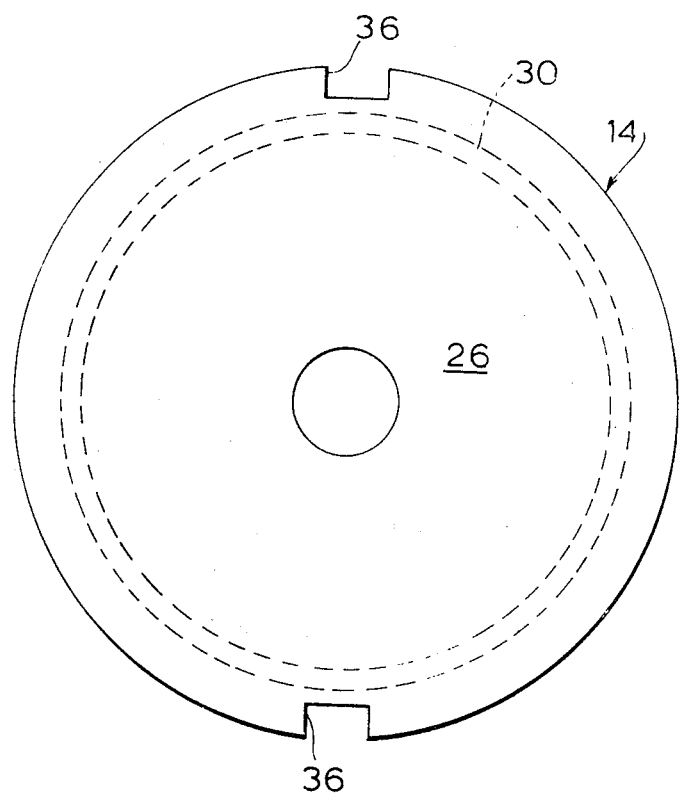

The invention will be described further, by way of example, with reference to the accompanying drawings, in which:

FIG. 1 is a vertical section through one embodiment of a liquid valve constructed in accordance with the present invention; and FIG. 2 is a plan view of the closure member of the valve of FIG. 1.

The liquid valve illustrated in the drawings comprises a valve body 10, bearing an inverted frusto-conical valve seat 12 and an axially displaceable closure member or plug 14 which is adapted to be raised and lowered relative to the valve seat 12 by a centrally mounted rod 16. The frusto-conical valve seat 12 is formed at the lower end of a cylindrical bore 18 in the valve body 10 by the inward facing surface of a downwardly tapering lip portion 20 of the valve body 10. The outward facing surface 22 of the lip portion 20 is also of inverted, frusto-conical configuration whereby the free end of the lip portion 20 defines a circular knife-edge 24.

The closure member 14 has the general shape of an inverted cup, having a disc-shaped base portion 26 attached to the spindle 16 and a downwardly extending, cylindrical portion 28 whose lower end bears a surface 30 of inverted, frusto-conical shape for engaging the valve seat 12. The diameter of the cylindrical portion 28 is such as to form a substantially liquid tight fit with the cylindrical bore 18 when said cylindrical portion 28 is engaged therein. The inwardly facing surface 32 of the cylindrical portion 28 extends substantially vertically, whereby the lower end of the closure member 14 also defines a circular knife-edge 34, this edge 34 and the edge 24 of the valve body together defining a composite knife-edge in the closed position of the valve whereby the collection of liquid on this edge, which could form drips, is inhibited.

The valve closure member 14 has vertically extending slots 36 in its peripheral surface. In the described embodiment, two such slots of rectangular cross-section are provided, although different numbers of slots of different shapes are possible. For ease of manufacture, the frusto-conical part of the closure member is stepped around its periphery at 38, whereby a circular space 40 of triangular section is formed between the frusto-conical surface 30 and the lower ends of the slots 36.

The circular, lower edge 42 of the cylindrical portion 28 of the closure member is slightly bevelled or cut back so as to be spaced from the junction 44 between the cylindrical bore 18 of the valve body and the frusto-conical surface 22, when the valve is in its closed position. This is to prevent jamming or sticking of the valve in its closed position.

In operation, the valve is opened by raising the closure member 14 to a position such that its lower edge 34 is somewhat above the level of an internal horizontal surface 46 of the valve body 10. In this position, there is a substantially free flow of liquid from a liquid storage tank (not shown) through the valve via an inlet port 48 connected to the storage tank. This flow is indicated by the arrows A and B in FIG. 1. Because of the inverted cone shape of the inner face of the valve seat 12, the flow of liquid through the valve is directed into a converging stream when it leaves the lower end of the valve. This action helps to prevent liquid from flowing onto the underside 22 of the valve body.

The means of displacing the rod 16 is not critical to the present invention and can be accomplished in any suitable manner, for example, electromagnetically, hydraulically, mechanically. Preferably, however, the rod is displaced pneumatically, the spindle passing through a liquid-tight seal to a pneumatic actuator (not shown).

When the target quantity of liquid for delivery is approached, the valve closure member 14 is lowered to an intermediate position in which liquid flow can only continue through the channels defined between the sots 36 and the bore 18. Since, as will be seen from FIG. 2, the cross-sectional area of the slots 36 is small, the flow is greatly restricted in this intermediate position. When the target quantity has been reached, the closure member is fully lowered into the position shown in FIG. 1 in which the lower rim 30 thereof seats on the frusto-conical valve seat 12.

Preferably, the latter closing action is accomplished in an abrupt movement, this action helping to forcibly expel liquid from the region of the space 40 and the valve seat 12. To achieve this abrupt closing action, the closing movement of the closure member can be assisted by the action of a spring (not shown).

As previously mentioned, the composite edge formed by the edges 24 and 34 of the valve seat and closure member in the closed position of the valve serve to ensure that all the liquid which has passed through the valve is delivered, in that drops of liquid can not be retained on the composite edge since this defines a downwardly depending, sharply pointed apex. In this way, an accurate quantity of liquid can be delivered through the valve.

In a preferred embodiment of the invention, the angle X (FIG. 1) between the horizontal and the underside 22 of the valve body is approximately 35°. In the preferred embodiment, the width of the frusto-conical contact face 30 of the closure member 14 should be of the order of one eight of an inch or less.

The valve body and closure member can be formed of any suitable material or materials but preferably the valve body is of stainless steel and the closure member is of plastics material, such as polypropylene.

I claim:

1. A valve for downwardly delivering liquid from a liquid store, comprising a valve body, means defining an annular valve seat on the valve body, a circular closure member, means for relatively displacing the closure member and the valve body for opening and closing of the valve, means defining a respective knife edge on the lowermost rim of the valve body and the lowermost rim of the closure member which, when the valve seat and closure member are in their closed position, are arranged to mate together to define a composite, depending knife edge.

2. A valve according to claim 1 in which said valve seat is formed adjacent said knife edge defined on the valve body.

3. A valve according to claim 2 in which the closure member comprises a cylindrical body which is closed at its upper end, the valve body has a cylindrical bore for slidably receiving said cylindrical body of the closure member in an intermediate and closed position of the valve, and means defining at least one vertically extending slot in the peripheral surface of the body of the closure member for the restricted passage of liquid in the intermediate position of the valve when said closure member body is partially inserted into said bore.

4. A valve according to claim 3 in which the lowermost rim of the valve body bears the valve seat on its inner face, and the lowermost rim of said cylindrical body of the closure member engages the valve seat in the closed position of the valve to shut off the flow of liquid through said slots, both said rims being of acute angled section, and the mating surfaces of the valve body and closure member both being of inverted, frusto-conical configuration.

5. A valve according to claim 4 in which said lowermost rim of the valve body is located on an annular, inwardly directed, tapered lip formed on the valve body at the lower end of said cylindrical bore.

6. A valve according to claim 5 in which the mating surfaces of the valve body and closure member each subtend an angle of substantially 45° to the horizontal.

7. A valve according to claim 6 in which the underside of the lip on the valve body bearing the valve seat subtends an angle of substantially 35° to the horizontal.

8. A valve according to claim 1 further comprising a rod attached to the valve closure member and means for axially displacing the rod for opening and closing of the valve.

9. A valve according to claim 8 in which the rod is adapted to be pneumatically displaced for opening and closing of the valve, the rod passing out of the valve body via a liquid-tight seal.

10. A valve according to claim 1 in which the valve body is constructed of stainless steel and the closure member is constructed of a plastics material.

11. A valve for downwardly delivering liquid from a liquid store comprising a valve body, means defining a circular bore in the valve body, a hollow circular plug of the general shape of an inverted cup, means enabling said plug to be raised and lowered relative to said cylindrical bore in the valve body, at least one vertical slot in the external surface of said plug for the restricted passage of liquid in an intermediate position of the valve, and means defining an acute angled, inverted cone-shaped lip on the valve body, the rim of the plug being of acute angled section around its edge, and being adapted to seat against said acute angled, inverted cone-shaped lip on the valve body, to shut off the flow of liquid through the slots when the valve is in its closed position.

* * * * *